(12) United States Patent
VanBlon et al.

(10) Patent No.: US 12,126,932 B2
(45) Date of Patent: Oct. 22, 2024

(54) BACKGROUND IMAGE ADJUSTMENT IN VIRTUAL MEETING

(71) Applicant: Lenovo (Singapore) Pte. Ltd., Singapore (SG)

(72) Inventors: Russell Speight VanBlon, Raleigh, NC (US); Axel Ramirez Flores, Cary, NC (US); Jason Grimme, Morrisville, NC (US); Jonathan Gaither Knox, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 747 days.

(21) Appl. No.: 17/190,046

(22) Filed: Mar. 2, 2021

(65) Prior Publication Data
US 2022/0286641 A1 Sep. 8, 2022

(51) Int. Cl.
| | | |
|---|---|---|
| *H04N 5/445* | (2011.01) | |
| *G06T 3/04* | (2024.01) | |
| *G06T 3/40* | (2024.01) | |
| *G06T 5/94* | (2024.01) | |
| *G06T 11/00* | (2006.01) | |
| *G06V 20/40* | (2022.01) | |

(52) U.S. Cl.
CPC .......... *H04N 5/44504* (2013.01); *G06T 3/04* (2024.01); *G06T 3/40* (2013.01); *G06T 5/94* (2024.01); *G06T 11/001* (2013.01); *G06V 20/40* (2022.01)

(58) Field of Classification Search
CPC .. H04N 5/44504; H04N 7/147; G06T 3/0012; G06T 3/40; G06T 5/008; G06T 11/001; G06V 20/40; G06V 20/50; G06V 40/16
See application file for complete search history.

(56) References Cited

U.S. PATENT DOCUMENTS

| | | | |
|---|---|---|---|
| 9,794,516 B1* | 10/2017 | Tuli | H04N 21/42204 |
| 9,936,162 B1* | 4/2018 | Gadnir | H04N 7/147 |
| 10,147,216 B1* | 12/2018 | Miao | G06T 5/50 |
| 10,929,982 B2* | 2/2021 | Hefny | G06T 5/80 |
| 2011/0217021 A1* | 9/2011 | Dubin | H04N 7/15 386/278 |
| 2012/0020568 A1* | 1/2012 | Kogane | G06V 40/16 382/195 |
| 2014/0176663 A1* | 6/2014 | Cutler | G06T 7/50 348/14.07 |
| 2014/0368669 A1* | 12/2014 | Talvala | G06T 7/194 348/207.1 |
| 2017/0019633 A1* | 1/2017 | Shaburov | G06V 40/161 |
| 2017/0324933 A1* | 11/2017 | Alrod | G06V 40/161 |

(Continued)

*Primary Examiner* — Twyler L Haskins
*Assistant Examiner* — John H Morehead, III
(74) *Attorney, Agent, or Firm* — FERENCE & ASSOCIATES LLC

(57) ABSTRACT

One embodiment provides a method, including: capturing, using a camera sensor of an information handling device, an image associated with a user; identifying, in a conferencing application, a background image for a video stream of the user; determining, based on comparing the background image to the image of the user, a contextual discrepancy for a superimposition of the image of the user over the background image; and adjusting, based on the determining, one or more aspects of the background image or one or more aspects of the image of the user to negate the contextual discrepancy. Other aspects are described and claimed.

18 Claims, 3 Drawing Sheets

(56) References Cited

U.S. PATENT DOCUMENTS

2021/0287377 A1* 9/2021 Jennings ................. G06T 7/215
2022/0239898 A1* 7/2022 Viswanathan Iyer .......................
                                                    H04N 19/105

* cited by examiner

BACKGROUND IMAGE ADJUSTMENT IN VIRTUAL MEETING

BACKGROUND

Individuals frequently utilize their information handling devices ("devices"), for example laptops and/or personal computers, tablets, smart phones, wearable devices, and the like to engage in a variety of different types of online conferences. For example, users may, through a conferencing application, attend a virtual business meeting, be present for an online class, engage in a video chat with friends, and the like. The existence of these conferencing applications enables disparately located individuals to effectively communicate with one another when meeting in person is inconvenient or not possible.

BRIEF SUMMARY

In summary, one aspect provides a method, comprising: capturing, using a camera sensor of an information handling device, an image associated with a user; identifying, in a conferencing application, a background image for a video stream of the user; determining, based on comparing the background image to the image of the user, a contextual discrepancy for a superimposition of the image of the user over the background image; and adjusting, based on the determining, one or more aspects of the background image or one or more aspects of the image of the user to negate the contextual discrepancy.

Another aspect provides an information handling device, comprising: a camera sensor; a processor; a memory device that stores instructions executable by the processor to: capture an image associated with a user; identify, in a conferencing application, a background image for a video stream of the user; determine, based on comparing the background image to the image of the user, a contextual discrepancy for a superimposition of the image of the user over the background image; and adjust, based on the determining, one or more aspects of the background image or one or more aspects of the image of the user to negate the contextual discrepancy.

A further aspect provides a product, comprising: a storage device that stores code, the code being executable by a processor and comprising: code that captures an image associated with a user; code that identifies, in a conferencing application, a background image for a video stream of the user; code that determines, based on comparing the background image to the image of the user, a contextual discrepancy for a superimposition of the image of the user over the background image; and code that adjusts, based on the determining, one or more aspects of the background image or one or more aspects of the image of the user to negate the contextual discrepancy.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
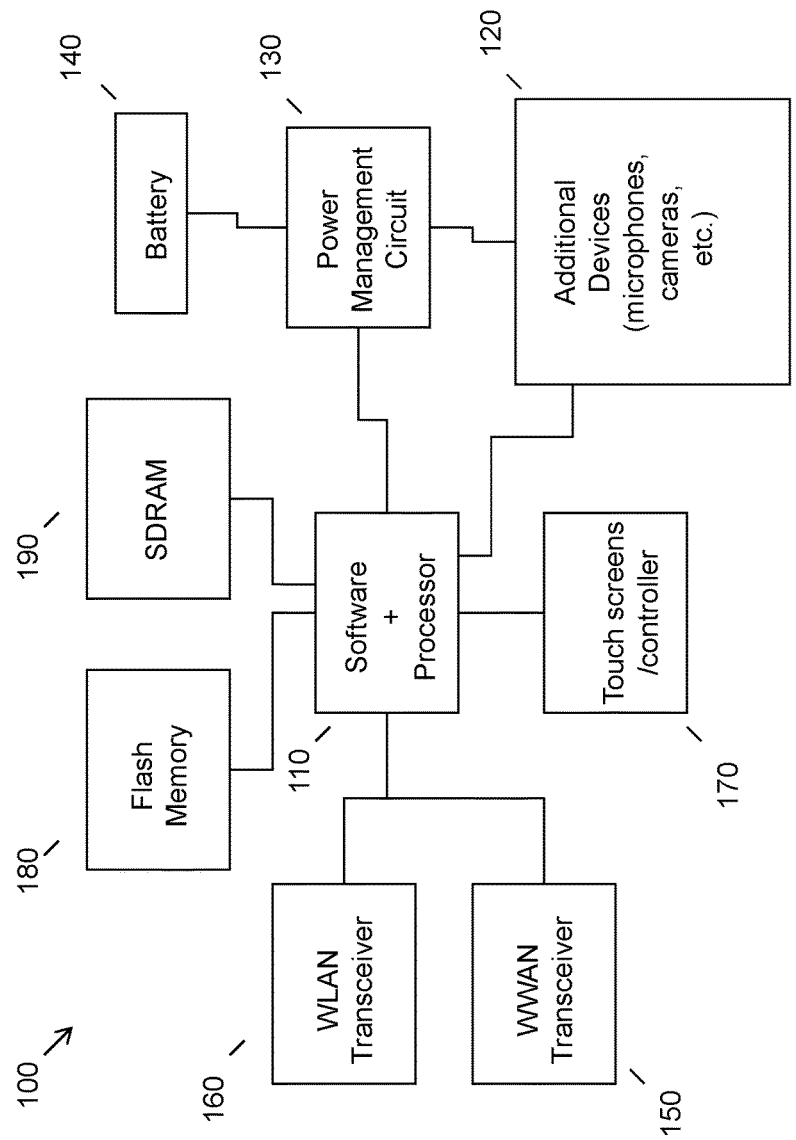
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The content conventionally broadcast to other individuals in a virtual meeting generally included only the material that was captured by a camera or video sensor associated with a user's device. For example, a user's video broadcast conventionally included images of them and whatever objects were located around and behind the user. Advances in technology have enabled individuals to augment and personalize the presentation of their video stream. More particularly, users are now able to utilize various digital filters to adjust the appearance of their real-world background (e.g., users may enact a blur effect on the real-world background, etc.) or, alternatively, are able to remove and replace their real-world background with a digital background (e.g., the digital background may be a single color, an image of a landscape or movie scene, a digitally created location, etc.).

A common issue with the foregoing is that the video from the user and the selected background don't always match in size, lighting, scenery, etc. This in turn may give a poor combined result and may negatively affect the overall presentation of the user's video stream. For example, the superimposition of the user's body over a particular background image may produce a combination that is unrealistic or not visually appealing (e.g., the user's body may be too large or small with respect to other objects present in the background image, etc.). Conventional solutions require a user to manually adjust the background image, or the positioning and/or settings of their camera sensor, if they want to have a more aesthetically pleasing result. Such a requirement is inconvenient and may become very burdensome if a user is required to make these adjustments each time a new background is chosen and/or every time a user changes position, changes the distance between themselves and the camera, encounters a new lighting condition, and the like.

Accordingly, an embodiment provides a method for adjusting aspects of a background image, or an image in a user, in a video stream. In an embodiment, an image of a user may be captured by a camera sensor. An embodiment may then identify a background image for a video stream of a user in a conferencing application (e.g., a meeting conference, a casual video chat, etc.). An embodiment may then compare the background image to the image of the user to determine whether a contextual discrepancy exists (e.g., a setting of the background image does not correlate to what a user in the image is wearing, a position or size of the user is not to scale with respect to objects in the background image, a lighting condition of the image of the user is not appropriate with respect to a color or lighting of the background image, etc.). Responsive to determining that the contextual discrepancy exists, an embodiment may adjust one or more aspects of the background image or the image of the user to negate the contextual discrepancy. Such a method may accordingly make dynamic changes to the presentation of the user's video stream to better contextualize a user's image with respect to a background image.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
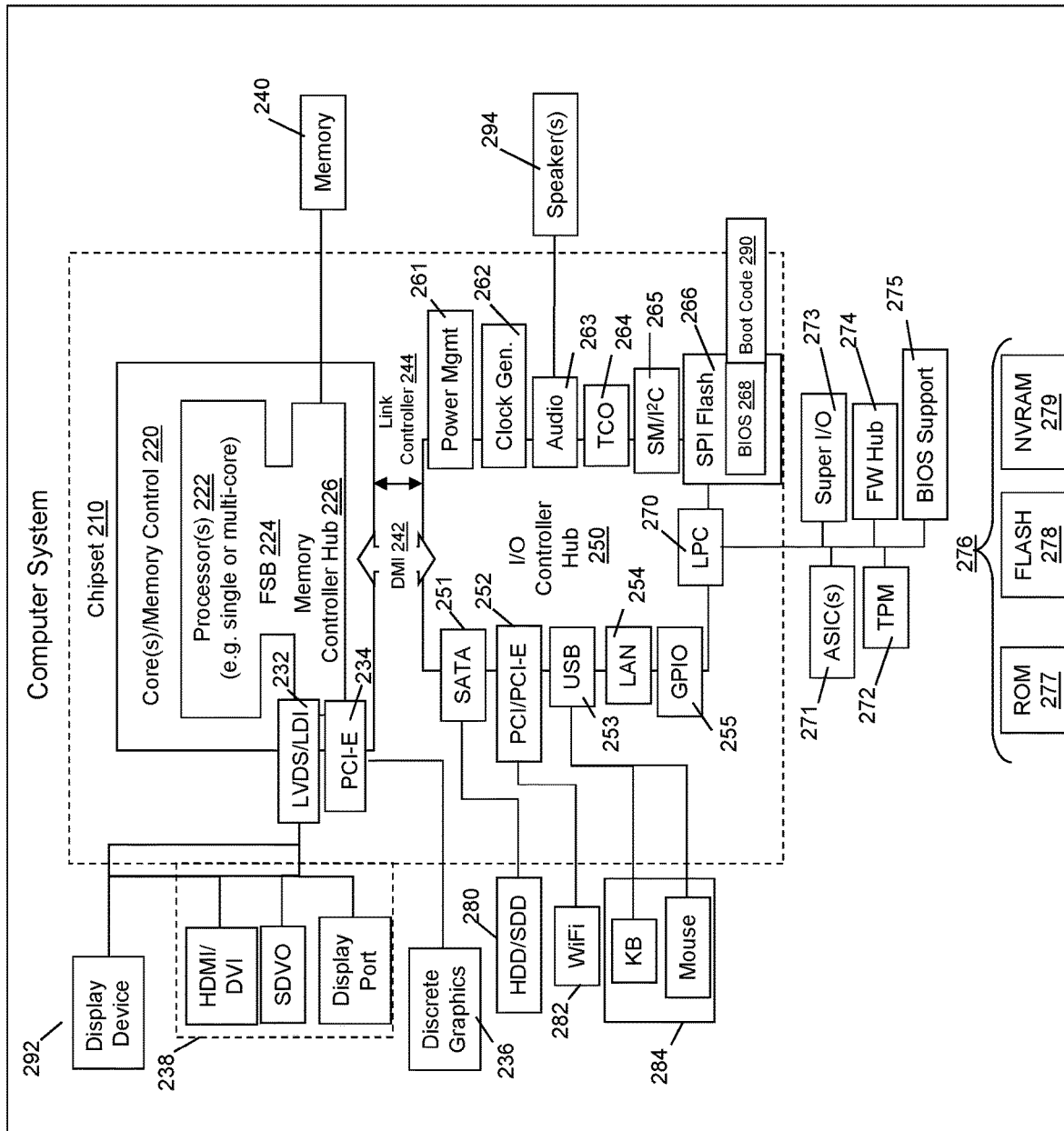
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of capturing pictures or videos of a user and in devices capable of supporting a conferencing application. For example, the circuitry outlined in FIG. 1 may be implemented in a smart phone or tablet embodiment, whereas the circuitry outlined in FIG. 2 may be implemented in a laptop computer.

Figure 3:
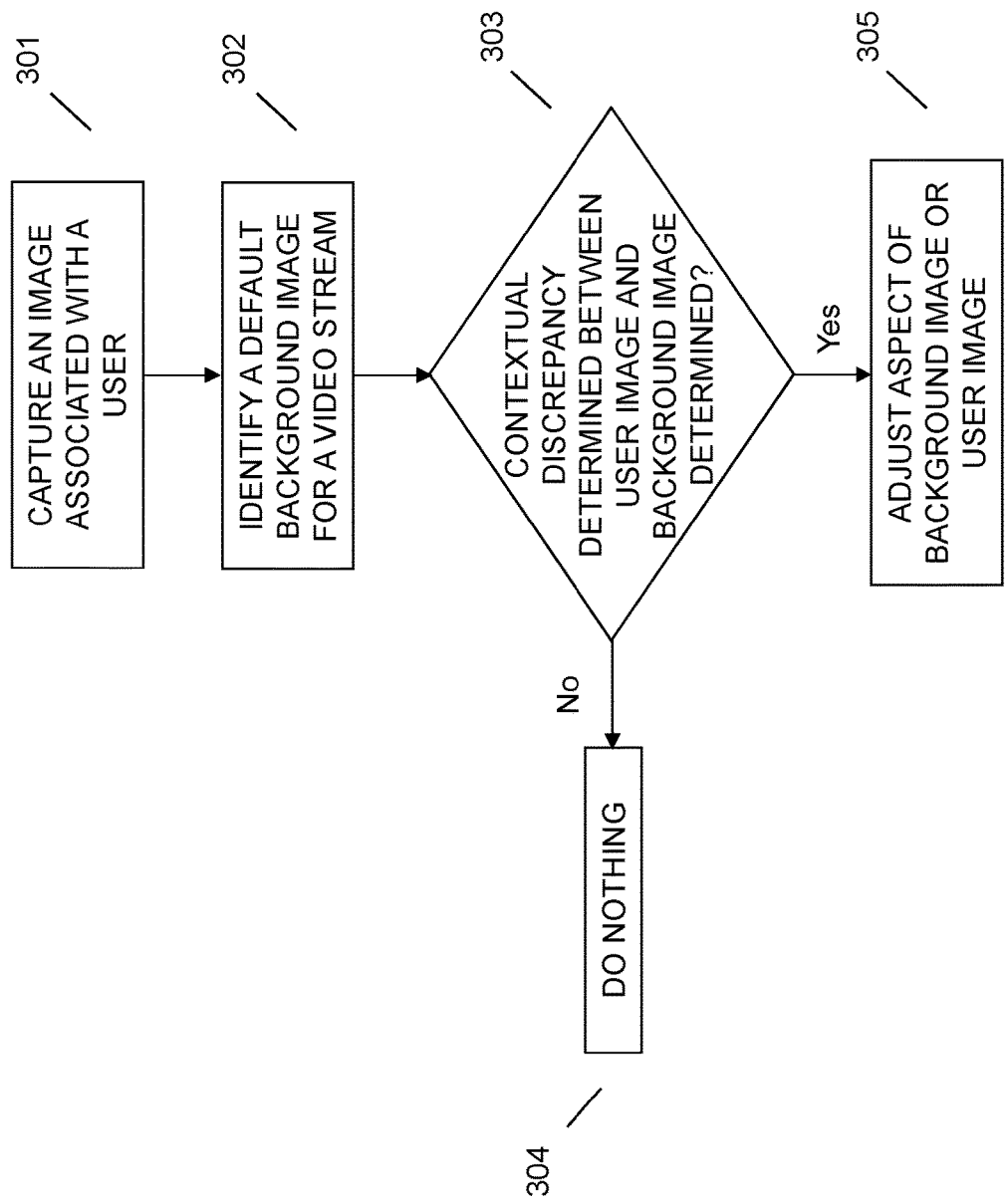
FIG. 3 illustrates an example method of adjusting aspects of a background image in a video stream.

Referring now to FIG. 3, a method for adjusting one or more aspects of a presentation of a video stream in a conferencing application is provided. At 301, an embodiment may capture an image of a user using a sensor (e.g., a camera sensor, a video sensor, a combination thereof, etc.) integrally or operatively coupled to the device. In the context of this application, an image of a user may correspond to either a static image (e.g., a single photograph, etc.) or a dynamic image (e.g., a video of the user, etc.). In an embodiment, the sensor may be configured to capture the image at a predetermined point and/or for a predetermined duration. For example, the sensor may be configured to capture a single image of the user in response to a particular event (e.g., when the user's device is turned on, when a conferencing application is initiated, in response to an image capture command, etc.). Additionally or alternatively, the sensor may be configured to continually capture images of the user (e.g., at predetermined intervals, continuously throughout a pendency of an online conference, etc.).

At 302, an embodiment may identify a background image utilized by the user in a conferencing application. In the context of this application, the background image may refer to a static or dynamic background setting that an image of the user is superimposed over. For example, the background image may be an image of a single color (e.g., a red or blue background, etc.), a landscape (e.g., a mountain range, a city scape, etc.), a popular television or movie scene, etc. This superimposition is thereafter what is presented to other individuals in the online conference. In the context of this application, an online conference may refer to virtually any type of visual virtual meeting between a user and at least one other individual (e.g., an online meeting, an online class, a group chat with friends, a live video or gaming stream, etc.).

At 303, an embodiment may determine whether a contextual discrepancy exists between the image of the user and the background image. In the context of this application, a contextual discrepancy may refer to one or more characteristics of the default background and/or image that may negatively affect a realistic or aesthetic presentation of the superimposition to the other individuals in the online conference. Responsive to determining, at 303, that no contextual discrepancy exists, an embodiment may, at 304, take no additional action. Conversely, responsive to determining, at 303, that a contextual discrepancy exists, an embodiment may, at 305, adjust one or more aspects of the background image or the image of the user to negate the contextual discrepancy. Pluralities of non-limiting examples of contextual discrepancies, along with determination techniques to identify these discrepancies and adjustments to negate these discrepancies, are subsequently described.

An embodiment may determine that the size of the user with respect to objects displayed in the background image (e.g., buildings, mountains, other individuals or objects, etc.) may be unrealistically skewed (e.g., the user may appear to be the same size as a tall building, the user may appear to be too small with respect to other objects in the background image, etc.). In this regard, an embodiment may first analyze the background image (e.g., using one or more image analysis techniques known in the art, etc.) to identify the objects present in the background image. An embodiment may thereafter identify whether a default superimposition of the user's image on the background is contextually appropriate. If it is not, then an embodiment may dynamically resize the objects in the background image and/or the image of the user to obtain a contextually appropriate superimposition. With respect to the image of the user, an embodiment may identify a minimum and/or maximum threshold size that the image of the user may be resized to. Such an embodiment may prevent situations where a user's size is reduced or increased to such an extent (e.g., so that a user's threshold size may be originally set by a manufacturer and/or may be later adjusted by the user.

Another embodiment may determine that a scene presented in the background image is not contextually appropriate for the nature, or formality, of the online conference. In this regard, an embodiment may first analyze a default background image (e.g., using one or more image analysis techniques known in the art, etc.) to identify the objects present in and/or the context associated with the background image. An embodiment may then identify a formality of the virtual meeting in the conferencing application. More particularly, an embodiment may identify whether the virtual meeting is associated with business (e.g., a work conference, etc.) or leisure (e.g., a group chat with friends, etc.). This identification may be done dynamically via access to and analysis of one or more items of context data (e.g., user's calendar data, email data, social media data, other types of communication data, etc.). Thereafter, an embodiment may compare the results of the background image analysis to the identified formality of the virtual meeting to determine whether the background image is appropriate for the meeting. If it is not, then an embodiment may dynamically adjust one or more aspects of the background image (e.g., an embodiment may crop out or censor one or more objects from the background image, etc.), dynamically switch to a different background image identified as being consistent with the meeting formality, or provide a notification to the user suggesting that changes should be made to the background image in view of the meeting formality.

Another embodiment may determine that a scene presented in the background image is not visually appealing, or is not contextually consistent, with an outfit that is worn by the user in the image. An example of the former may be that the background is the same color as the user's outfit as opposed to a more complimentary color. An example of the latter may be that the setting of the background does not match the theme of a costume a user is wearing. To facilitate the determination, an embodiment may first analyze a default background image (e.g., using one or more image analysis techniques known in the art, etc.) to identify the objects present in and/or the context associated with the background image. An embodiment may then identify characteristics of an outfit worn by the user in the image (e.g., color of the outfit, types of clothing articles in the outfit, etc.). An embodiment may thereafter compare the outfit to the background setting to determine whether an inconsistency exists, as described above. Responsive to determining that an inconsistency does exist, an embodiment may dynamically adjust one or more aspects of the background image, or switch to a more contextually appropriate background, to remedy the determined inconsistency.

Another embodiment may determine that the image of the user has a sub-optimal lighting condition with respect to the background image. More particularly, if a user is in an area with poor lighting, the resultant image of the user may not coordinate well with the background. In such a situation, an embodiment may either recommend a different background image that more closely matches the lighting levels of the user's image or, alternatively, may try to dynamically adjust the colors of the video picture received from the camera sensor. For example, a user's face may present darker than normal because the light behind the user is too bright. In such a case, an embodiment may attempt to adjust to settings associated with the camera sensor to lighten the image of the user.

Another embodiment may determine that the image of the user is positioned over a sub-optimal area of the background image. In this regard, an embodiment may identify that the image of the user is positioned over an unfocused area of the background image or is positioned over one or more objects presented in the background image. In such a situation, an embodiment may dynamically adjust a positioning of the image of the user to a more optimal location with respect to the background image. For example, an embodiment may dynamically center the image of the user in a focused area of the background image. In another example, an embodiment may adjust the position of the image of the user so that it does not overlap objects present in the background image.

In an embodiment, the adjustment may occur dynamically (i.e., without additional user input) or, alternatively, may not commence until receipt of user selection or authorization input. More particularly, an embodiment may provide the user with a notification containing a list of potential options that they can choose from to negate the contextual discrepancy. For example, the notification may contain a list of alternative backgrounds, a list of proposed background image or user image setting adjustments, a combination thereof, and the like.

The various embodiments described herein thus represent a technical improvement to conventional methods for adjusting presentation settings of a user's image in a conferencing application. Using the techniques described herein, an embodiment may first capture an image associated with a user. An embodiment may then identify a background image for a video stream of the user and thereafter determine, based on comparison of the background image to the image of the user, whether a contextual discrepancy exists for a superimposition of the image of the user over the background image. Responsive to determining that a contextual discrepancy exists, an embodiment may adjust one or more aspects of the background image, or one or more aspects of the image of the user, to negate the contextual discrepancy.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   capturing, using a camera sensor of an information handling device, an image associated with a user;
   identifying, in a conferencing application, a background image for a video stream of the user;
   determining, based on comparing the background image to the image of the user, a contextual discrepancy for a superimposition of the image of the user over the background image, wherein the contextual discrepancy comprises one or more aspects of the image of the user compared to the background image that negatively affects a realistic presentation of the superimposition, wherein the determining the contextual discrepancy comprises identifying whether a size of the user in the image is not to scale with a size of an object in the background image; and adjusting, based on the determining, one or more aspects of the background image or one or more aspects of the image of the user to negate the contextual discrepancy, wherein the adjusting comprises adjusting, responsive to determining the size of the user is not to scale with the size of the object, at least one of: the size of the object in the background image or the size of the image of the user.

2. The method of claim 1, wherein the adjusting comprises dynamically adjusting without receiving additional user input.

3. The method of claim 1, wherein the determining the contextual discrepancy comprises identifying that an outfit worn by the user in the image is not contextually compatible with a scene displayed in the background image and wherein the adjusting comprises adjusting the scene in the background image to match the outfit.

4. The method of claim 3, wherein the adjusting the scene comprises one of: adjusting a color of the scene or changing the scene to another scene.

5. The method of claim 1, further comprising identifying a scaling threshold and wherein the adjusting comprises not adjusting the size of the object in the background image or the size of the image of the user past the scaling threshold.

6. The method of claim 1, wherein the determining the contextual discrepancy comprises identifying that a scene presented in the background image is not compatible with a meeting formality and wherein the adjusting comprises adjusting the scene in the background image to match the meeting formality.

7. The method of claim 1, wherein the determining the contextual discrepancy comprises identifying that the image of the user has a sub-optimal lighting condition with respect to the background image and wherein the adjusting comprises adjusting at least one of: a brightness of the background image or a brightness of the image of the user to improve the sub-optimal lighting condition.

8. The method of claim 1, wherein the determining the contextual discrepancy comprises identifying that the image of the user is positioned over a sub-optimal area of the background image and wherein the adjusting comprises adjusting a position of the image of the user to an optimal area of the background image.

9. The method of claim 1, further comprising providing the user with an option notification of at least one other background image that negates the contextual discrepancy.

10. An information handling device, comprising:
a camera sensor;
a processor;
a memory device that stores instructions executable by the processor to:
capture an image associated with a user;
identify, in a conferencing application, a background image for a video stream of the user;
determine, based on comparing the background image to the image of the user, a contextual discrepancy for a superimposition of the image of the user over the background image, wherein the contextual discrepancy comprises one or more aspects of the image of the user compared to the background image that negatively affects a realistic presentation of the superimposition, wherein the determining the contextual discrepancy comprises identifying whether a size of the user in the image is not to scale with a size of an object in the background image; and
adjust, based on the determining, one or more aspects of the background image or one or more aspects of the image of the user to negate the contextual discrepancy, wherein the adjusting comprises adjusting, responsive to determining the size of the user is not to scale with the size of the object, at least one of: the size of the object in the background image or the size of the image of the user.

11. The information handling device of claim 10, wherein the instructions executable by the processor to adjust comprise instructions executable by the processor to dynamically adjust without receiving additional user input.

12. The information handling device of claim 10, wherein the instructions executable by the processor to determine the contextual discrepancy comprise instructions executable by the processor to identify that an outfit worn by the user in the image is not contextually compatible with a scene displayed in the background image and wherein the instructions executable by the processor to adjust comprise instructions executable by the processor to adjust the scene in the background image to match the outfit.

13. The information handling device of claim 12, wherein the instructions executable by the processor to adjust the scene comprise instructions executable by the processor to: adjust a color of the scene or change the scene to another scene.

14. The information handling device of claim 10, wherein the instructions executable by the processor to determine the contextual discrepancy comprise instructions executable by the processor to identify that a scene presented in the background image is not compatible with a meeting formality and wherein the instructions executable by the processor to adjust comprise instructions executable by the processor to adjust the scene in the background image to match the meeting formality.

15. The information handling device of claim 10, wherein the instructions executable by the processor to determine the contextual discrepancy comprises identifying that the image of the user has a sub-optimal lighting condition with respect to the background image and wherein the instructions executable by the processor to adjust comprise instructions executable by the processor to adjust at least one of: a brightness of the background image or a brightness of the image of the user to improve the sub-optimal lighting condition.

16. The information handling device of claim 10, wherein the instructions executable by the processor to determine the contextual discrepancy comprise instructions executable by the processor to identify that the image of the user is positioned over a sub-optimal area of the background image and wherein the instructions executable by the processor to adjust comprise instructions executable by the processor to adjust a position of the image of the user to an optimal area of the background image.

17. The information handling device of claim 10, wherein the instructions are further executable by the processor to provide the user with an option notification of at least one other background image that negates the contextual discrepancy.

18. A product, comprising:
a storage device that stores code, the code being executable by a processor and comprising:
code that captures an image associated with a user;

code that identifies, in a conferencing application, a background image for a video stream of the user;

code that determines, based on comparing the background image to the image of the user, a contextual discrepancy for a superimposition of the image of the user over the background image, wherein the contextual discrepancy comprises one or more aspects of the image of the user compared to the background image that negatively affects a realistic presentation of the superimposition, wherein the determining the contextual discrepancy comprises identifying whether a size of the user in the image is not to scale with a size of an object in the background image; and code that adjusts, based on the determining, one or more aspects of the background image or one or more aspects of the image of the user to negate the contextual discrepancy, wherein the adjusting comprises adjusting, responsive to determining the size of the user is not to scale with the size of the object, at least one of: the size of the object in the background image or the size of the image of the user.

* * * * *